United States Patent [19]

Ciupke

[11] 4,066,348
[45] Jan. 3, 1978

[54] CARTRIDGE VIEWER

[75] Inventor: Werner W. Ciupke, Burlingame, Calif.

[73] Assignee: Montron Corporation, Mountain View, Calif.

[21] Appl. No.: 578,107

[22] Filed: May 16, 1975

[51] Int. Cl.² ............................................. G03B 21/00
[52] U.S. Cl. ..................................... 352/129; 352/128
[58] Field of Search ............... 352/126, 127, 128, 129, 352/72, 78 R

[56] References Cited

U.S. PATENT DOCUMENTS

| | | | |
|---|---|---|---|
| 1,469,830 | 10/1923 | Tessier | 352/166 X |
| 3,074,311 | 1/1963 | Kapilow | 352/129 |
| 3,479,112 | 11/1969 | Lester | 352/126 |
| 3,561,851 | 2/1971 | Martin | 352/78 R |
| 3,677,628 | 7/1972 | Walker | 352/128 |
| 3,706,439 | 12/1972 | Skinner | 352/78 R |

Primary Examiner—Monroe H. Hayes
Attorney, Agent, or Firm—Flehr, Hohbach, Test, Albritton & Herbert

[57] ABSTRACT

Cartridge viewer having means forming a framework with indexing means mounted thereon. The indexing means has an aperture therein and a pair of spaced apart index projections disposed on opposite sides of the aperture. A continuous length of film having perforations along one edge thereof is provided. Guide means is provided for guiding the film over the indexing means and past the aperture. A sprocket engages the film. A drive member is rotatably mounted in the framework and is connected to the sprocket for driving the sprocket and advancing the film past the aperture. Crank means accessible from the exterior of the framework is provided for rotating the drive member. The spool is rotatably mounted in the framework and a portion of the length of film is formed as a roll on said spool with said spool being formed so that the film can be payed out continuously either from the inside of the roll or from the outside of the roll. Optical means is carried by the framework for viewing the film in the aperture. The framework carries an eyepiece which can be placed adjacent the eye to permit viewing of the image in the optical means. Means is provided within the framework for receiving light exterior of the cartridge and for directing light through the film disposed in the aperture so that the portion of the film which is disposed in the aperture is visible through the optical means.

1 Claim, 8 Drawing Figures

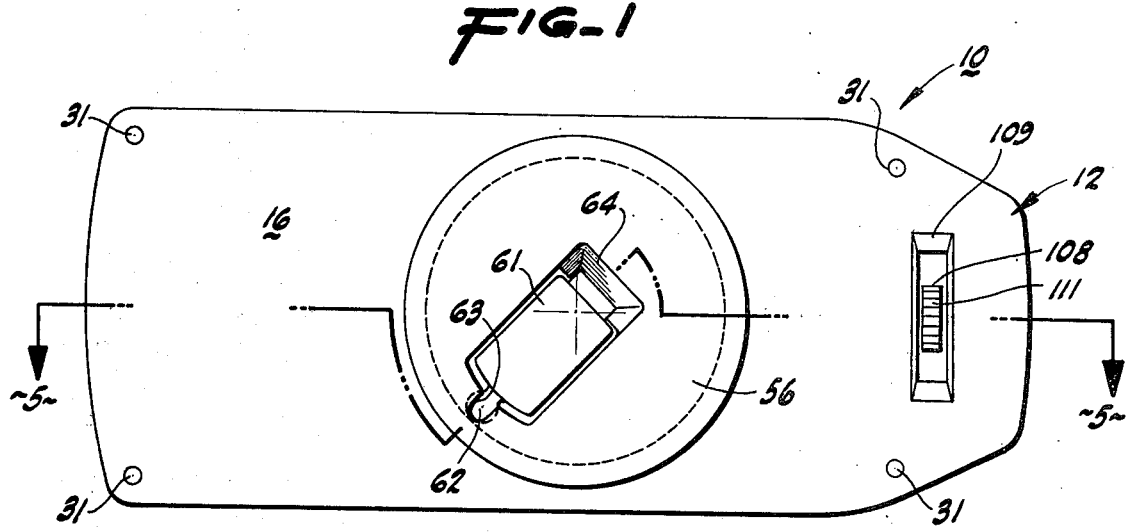
FIG-1
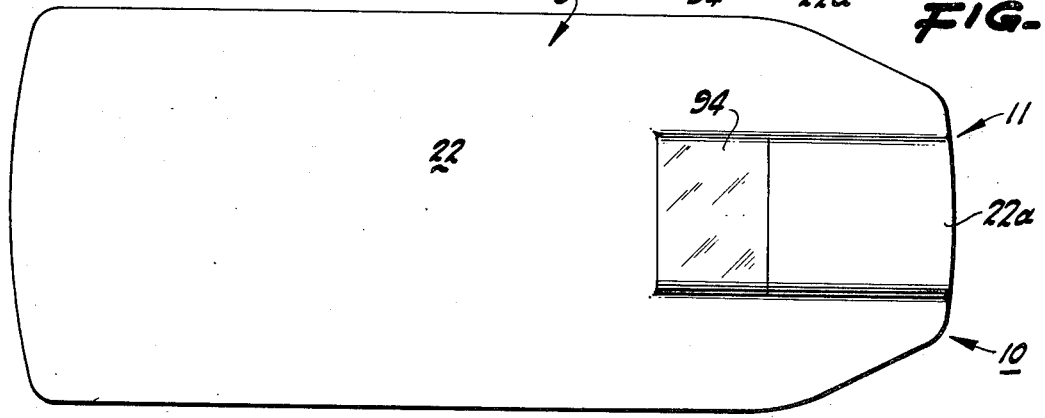
FIG-2
FIG-3
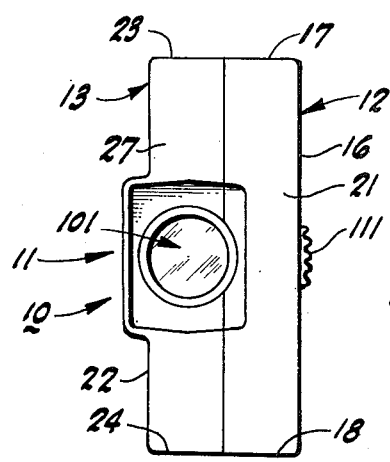
FIG-4

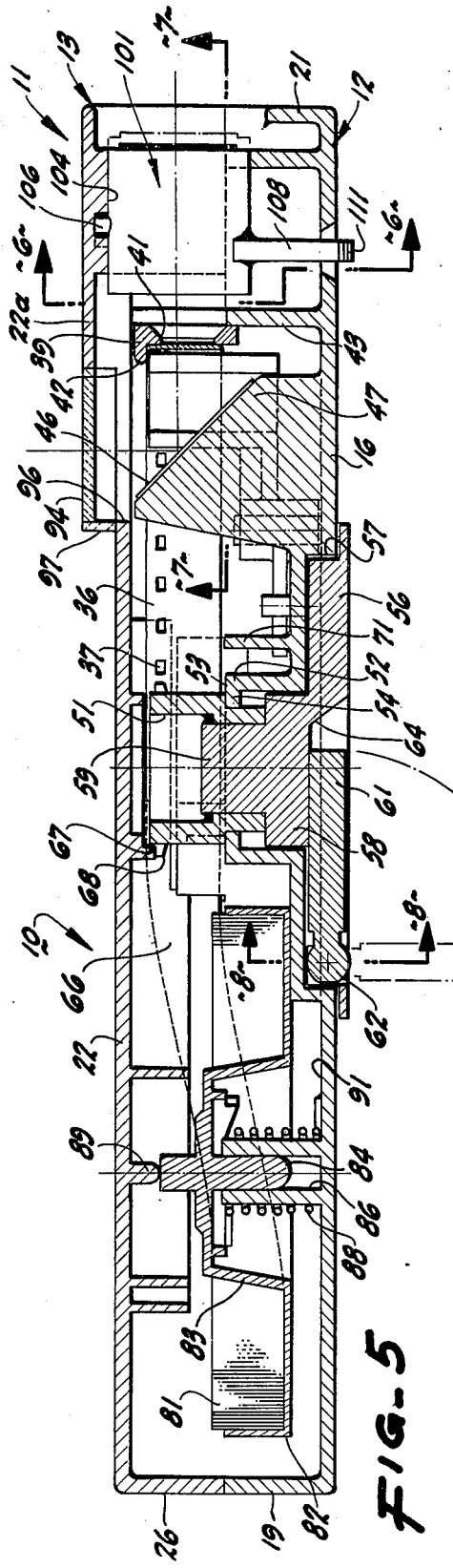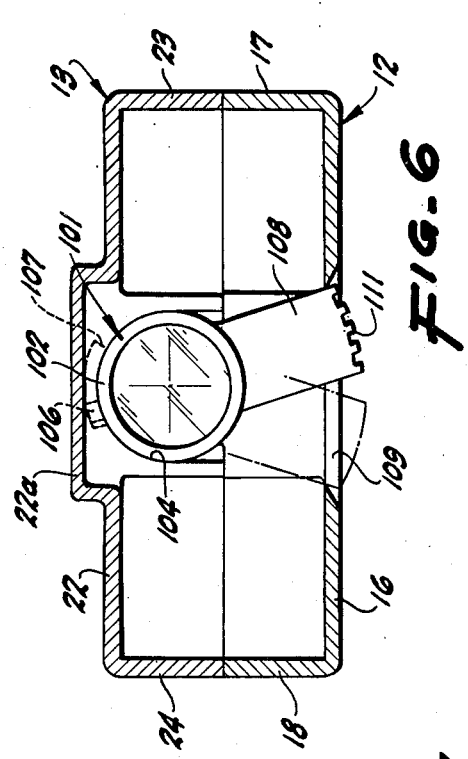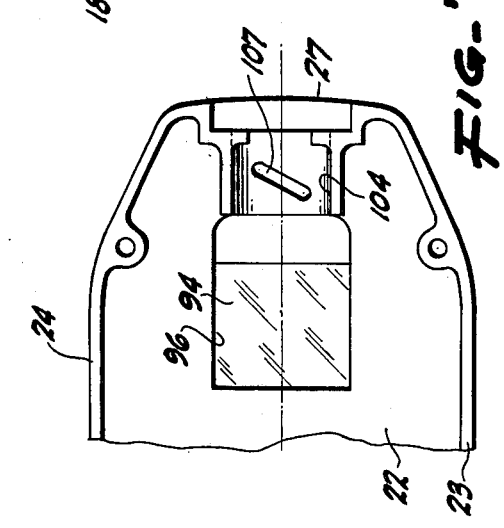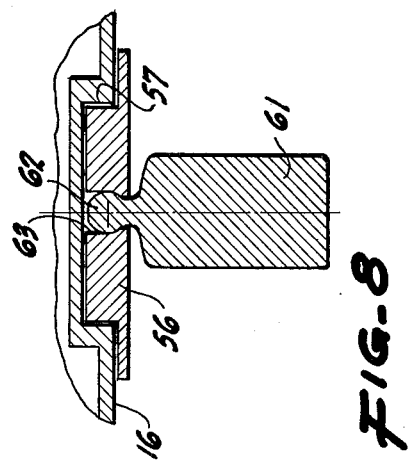

1

CARTRIDGE VIEWER

BACKGROUND OF THE INVENTION

In U.S. Pat. Nos. 3,706,439 and 3,817,610 there are disclosed viewers which utilize separate cartridges. The same is true in copending application Ser. No. 535,376, filed Dec. 23, 1974. In all of these embodiments there is a need for a viewer and separate cartridges which can be removably inserted therein. In certain applications, it has been found that there is a need for a simplified arrangement which does not require the use of separate viewers and separate cartridges. There is, therefore, a need for a new and improved cartridge viewer which eliminates such difficulties.

SUMMARY OF THE INVENTION AND OBJECTS

The cartridge viewer consists of means forming a framework having indexing means mounted thereon. The indexing means has an aperture therein and a pair of spaced apart index projections disposed on opposite sides of the aperture. A continuous length of film having perforations along one edge thereof is provided within the framework. Guide means is provided in the framework for guiding the film over the indexing means and past the aperture. A sprocket engages the film. A drive member is rotatably mounted in the framework and is connected to the sprocket for driving the sprocket and advancing the film past the aperture. Crank means is provided in the framework accessible from the exterior of the framework for rotating the drive member. A spool is rotatably mounted in the framework. A portion of the length of film is formed as a roll and is disposed in the spool. The spool is formed so that the film can be payed out continuously either from the inside of the roll or the outside of the roll. Optical means is carried by the framework for viewing the portion of the film in the aperture. The framework carries an eyepiece which can be placed against the eye for viewing of the image in the optical means. Means is provided within the framework for receiving light exterior of the cartridge viewer and for directing light through the portion of the film in the aperture so that the portion of the film in the aperture will be visible in the optical means.

In general, it is an object of the present invention to provide a cartridge viewer which combines features of the viewer and the cartridge in a single unit.

Another object of the invention is to provide a cartridge viewer of the above character which is relatively compact and is relatively simple to manufacture and assemble.

Another object of the invention is to provide a cartridge viewer of the above character in which there are no external projections.

Another object of the invention is to provide a cartridge viewer of the above character which is relatively compact and light-weight.

Additional objects and features of the invention will appear from the following description in which the preferred embodiment is set forth in detail in conjunction with the accompanying drawing.

BRIEF DESCRIPTION OF THE DRAWINGS

FIG. 1 is a side elevational view of the cartridge viewer incorporating the present invention.

FIG. 2 is a top view of the cartridge viewer as shown in FIG. 1.

FIG. 3 is a side elevational view of the side opposite that shown in FIG. 1 of the cartridge viewer shown in FIG. 1.

FIG. 4 is a front elevational view of the cartridge viewer shown in FIG. 1.

FIG. 5 is a cross-sectional view taken along the line 5—5 of FIG. 1.

FIG. 6 is a cross-sectional view taken along the line 6—6 of FIG. 5.

FIG. 7 is a cross-sectional view taken along the line 7—7 of FIG. 5.

FIG. 8 is a cross-sectional view taken along the line 8—8 of FIG. 5.

DESCRIPTION OF PREFERRED EMBODIMENT

The cartridge viewer 10 consists of a case 11 which serves as a framework. The case 11 is formed in two separate parts 12 and 13, each of which is a one-piece construction that can be formed in a suitable manner such as by injection molding of plastic. The part 12 is provided with a planar side wall 16. As can be seen particularly from FIG. 1, the front portion of the planar side wall 16 is truncated, whereas the rear end of the same is arcuate. The part 12 is also provided with top and bottom walls 17 and 18 which are generally planar as shown with the exception that near the front extremity they curve inwardly. The part 12 is also provided with a curved rear wall 19 and a slightly curved front wall 21.

Similarly, the other part 13 is provided with a planar side wall 22, top and bottom walls 23 and 24, and rear and front walls 26 and 27. The two parts 12 and 13 are formed in such a manner so that their top and bottom walls and the rear and front walls register with each other to form the enclosed case 11. The two parts 12 and 13 carry means for ensuring such registration in the form of registration pins 31 carried by the part 12, two of which are mounted adjacent the rear wall 19 and two of which are mounted adjacent the front wall 21 as shown in FIGS. 1 and 2. The pins 31 are adapted to seat within mating holes 32 provided in the part 13 adjacent the rear wall 26 and the front wall 27. By fitting the two parts 12 and 13 together as shown in FIG. 13 with the registration pins 31 inserted in the holes 32, it can be seen that the two parts are brought into alignment with each other and form the enclosed case 11. The pins 31 form a friction fit with the holes 32 and serve to retain the two parts 12 and 13 together and also permit the two parts to be separated for a purpose hereinafter described.

An endless length of film 36 is disposed within the case 11 and is provided with spaced perforations 37 along at least one edge of the same. While the present invention is discussed in conjunction with the use of such a continuous loop or length of film, it should be appreciated that many of the principles of the present invention can be utilized in conjunction with a non-continuous loop with the use of separate supply and take-up reels for the film. The length of film 36 is of a conventional type and is provided with a plurality of spaced frames which extend longitudinally of the length of film.

The perforations 37 of the film are adapted to be engaged by a pair of spaced apart index tits or projections (not shown) carried by an index plate 39. The index plate 39 is of the type described in copending application Ser. No. 535,376, filed Dec. 23, 1974. The index plate 39 is provided with an aperture 41. The tits are disposed on opposite sides of the aperture along the path of travel of the film 36. The index plate 39 is provided with a guide rib 42 which is adapted to guide one edge of the film 36. If desired, the index plate 39 can be formed integral with the part 12. However, if desired and as shown in the drawing, the index plate 39 can be formed as a separate part and mounted by dovetail means (not shown) carried by an upstanding rib 43 provided on the planar wall 16 as described in copending application Ser. No. 535,376, filed Dec. 23, 1974.

Means is provided within the case 11 for receiving light introduced into the case and for directing it through the film frame in the aperture 41 and consists of a mirror 46 formed of a suitable material such as chrome-plated foil which is bonded to a mirror support 47 formed integral with the part 12. As shown, the mirror support 47 provides a surface so that the mirror 46 is inclined at approximately a 45° angle with respect to the planar side wall 16.

Means is provided for advancing the length of film 36 and consists of a single sprocket 51 which is rotatably mounted in a cylindrical boss 52 formed integral with the part 12 and extending upwardly into the case from the side wall 16. The cylindrical boss 52 is provided with an upper bearing surface 53 which is engaged by bearing surface 54 provided on the sprocket 51. A disc-like drive member 56 is rotatably mounted in a circular recess 57 provided in the side wall 16 and is provided with a first boss 58 which is rotatably seated within the boss 52. In addition, it is provided with another boss 59 which is seated within the sprocket 51 and is secured thereto by suitable means such as a plastic cement, assuming that the parts are formed of plastic.

Handle means is provided for driving the disc-like member so that it can be grasped by hand to cause rotation of the drive member. Such handle means consists of the handle 61. Means is provided for forming a pivotal connection between the handle 61 and the drive member 56 and consists of the ball 62 which is carried by the handle 61 and the socket 63 which receives the ball which is provided in the drive member 56. Drive member 56 is provided with a recess 64 which is formed so that it is adapted to receive the handle 61 in such a manner so that the outer surface of the handle 61 is flush with the outer surface of the drive member 56 as shown in the solid line position in FIG. 5. As shown in FIG. 8, the handle is adapted to be moved out of the recess 64 into a position so that it is substantially at right angles to the surface of the drive member 56 to permit the same to be grasped by hand and to permit it to be used to rotate the drive member. The ball and socket connection provided for the handle permits the handle to be held in a fixed position between a pair of fingers of the hand while the drive member 56 is being rotated.

The cover 13 is provided with a raised rib-like structure 66 which is formed integral with the side wall 22 and which forms a circular recess 67 which is adapted to receive the uppermost extremity of the sprocket 51 to guide the same. As described in copending application Ser. No. 535,376, filed Dec. 23, 1974, the length of film 36 is formed in upper and lower runs which are engaged by teeth 68 carried by the sprocket extending into the perforations 37.

Means is provided within the case 11 for guiding the upper and lower runs into and out of engagement with the sprocket 51 and consists of a rib-like structure 71, only a portion of which is shown of the type described in copending application Ser. No. 535,376, filed Dec. 23, 1974.

Means is provided within the case 11 for causing the length of film 36 to be advanced frame by frame in a stepwise fashion across the aperture 41 and is of the type described in copending application Ser. No. 535,376, filed Dec. 23, 1974. As disclosed therein, such means consists of a pair of pivot arms (not shown). The pivot arms have arcuate portions which are adapted to engage the upper and lower runs of the film. Yieldable means is provided for urging the arcuate portions in a direction away from the tits or projections 38 in the form of a spring (not shown).

As described in copending application Ser. No. 535,376, filed Dec. 23, 1974, a substantial portion of the length of film 36 is formed to a roll 81 which is disposed in a spool 82. The spool 82 is a cup-shaped member and is provided with an inner hub 83. A pin 84 is carried by the hub and is rotatably seated in a well 86 formed in the part 12. As also described in said copending application Ser. No. 535,376, filed Dec. 23, 1974, means is provided for permitting the spool 82 to spin freely in one direction and to prevent it from rotating in a reverse direction which includes a spring 88. A pin 89 is provided in the part 13 for retaining the spool 82 seated within the well 86. As can be seen from FIG. 5, the part 12 is provided with a recess 91 which generally underlies most of the spool 82 so as to permit relatively free rotation of the spool.

The part 13 is provided with a U-shaped window member 94 formed of a suitable transparent material such as plastic which overlies an opening 96 provided in the side wall 22 of the part 13. One side of the window member 94 engages an upstanding transparent member 97 which is bonded to the part 13 to permit light to enter from the rear. The front side of the window member 94 is in registration with a U-shaped portion 22a formed in the forward portion of the side wall 22. The light which enters the window members 94 and 97 is adapted to impinge upon the mirror 46 and to direct light forwardly through the frame of the film which is in the aperture 41.

The cartridge viewer 10 is provided with means whereby the human eye can view the frame which is disposed in the aperture 41. Such means consists of an optical assembly 101 of the type described in U.S. Pat. No. 3,819,257. As described therein, such an optical assembly includes a barrel-like member 102 which has a pair of lenses 103 carried thereby. The optical assembly 101 is carried by an arcuate recess 104 provided in the part 13 and is retained therein by guide ribs (not shown) provided in the part 12. The barrel 102 is provided with a projection 106 which is seated in an inclined slot 107 which when the barrel 102 is rotated causes movement of the optical assembly 101 along an axis which is perpendicular to the plane of the aperture 41 in which the film frame is disposed. Means is provided for causing rotational movement of the barrel 102 and, therefore, movement of the projection 106 in the slot 107 and consists of a focusing member 108 which is secured to the barrel 102 and which extends outwardly through a slot 109 provided in the part 12. The focusing member 108 is provided with a knurled surface 111 to facilitate frictional engagement between a finger of the hand and the focusing member 108 to permit focusing of the optical assembly 101 so that the image which is given to the viewer by the optical assembly 101 from the frame in the aperture 41 is in focus.

The case 11 is formed in such a manner that the front walls 21 and 27 of the parts 12 and 13 provide a curved surface which can be placed against the eye of the human being who is doing the viewing while still providing a small space between the eye of the viewer and the optical assembly 101.

Operation and use of the cartridge viewer may now be briefly described as follows. First, it should be pointed out that the general operation of the movement of the film within the cartridge viewer 10 is substantially identical to that described in conjunction with the film cartridge in the copending application Ser. No. 535,376, filed Dec. 23, 1974. The principal difference between the film cartridge disclosed in that application and the cartridge viewer of the present invention is that the film cartridge in the copending application required the use of a separate viewer, whereas the cartridge viewer of the present invention is a self-contained unit which does not require the use of a separate viewer. The cartridge viewer combines the functions of both of the film cartridge and of the separate viewer.

Let it be assumed that an endless loop of film has been placed in the case 11 and that it has been threaded in the manner described in copending application Ser. No. 535,376, filed Dec. 23, 1974. As soon as the film has been loaded in the case, the case can be closed. It should be understood in this connection that, if desired, a cartridge viewer could be constructed with a single endless or continuous loop of film disposed in the cartridge with no intent of removing the same. However, as pointed out previously if desired, the cartridge viewer is formed in such a manner that the case 11 can be separated into two parts to facilitate changing the endless loops of film which are provided in the cartridge viewer.

Assuming that an endless length of film has been provided in the case, the cartridge viewer is ready for use in a situation where there is ambient light. Light will pass through the window member 94 and will be reflected by the mirror 46 through the frame of film in the aperture 41. This light will pass through the optical assembly 101 where the image formed by the optical assembly can be viewed by the viewer.

Now let it be assumed that it is desired to advance the film within the cartridge viewer. As described in copending application Ser. No. 535,376, filed Dec. 23, 1974, the film can be advanced in either direction. When it is desired to advance the film, the handle 61 is lifted out of the recess 64 and is grasped by one hand while the other hand is holding the viewer to the eye. The user then uses the handle 61 as a crank to rotate the drive member 54. This causes rotation of the sprocket 51 which engages the film and causes the film to be advanced step by step and frame by frame past the aperture 41 provided in the index plate to provide motion pictures in a manner well known to those skilled in the art. As pointed out previously, the film can be advanced in either direction upon the desire of the viewer merely by reversing rotation of the drive member 56. The optical assembly 101 can be readily adjusted by the viewer so that the image obtained from the film is in focus.

As soon as the user has completed the viewing operation, the handle 61 can be released and placed into the recess 64 so that it is flush with the outer surface of the drive member 56.

It is apparent from the foregoing that there has been provided a cartridge viewer which combines the functions of the film cartridge and a separate viewer. By combining such functions, it is possible to provide a relatively inexpensive hand-held device which can be utilized for viewing motion picture film. This construction is such that it can be formed by mass production techniques. It also has been formed in such a manner so that it can be readily formed from plastic which lends itself to mass production. In addition, it can be seen that the cartridge viewer is constructed in such a manner so that it has a relatively attractive appearance. It is also constructed in such a manner that it requires very little space. When not in use, the cartridge viewers can be stacked one above the other so that they can be stored in a relatively small space.

What is claimed is:

1. In a cartridge viewer, means forming a framework with indexing means carried thereby, the indexing means having an aperture therein and a pair of spaced apart index projections disposed on opposite sides of the aperture, an endless length of film having perforations along one edge of the same, guide means disposed within the framework for guiding the film over the indexing means and past the aperture, a sprocket carried by the framework and engaging the film, a drive member rotatably mounted upon the framework and connected to the sprocket for driving the sprocket and advancing the film past the aperture in forward and reverse directions, crank means carried by the drive member accessible from the exterior of the framework for rotating the drive member at the same speed in forward and reverse directions, a spool rotatably mounted in the framework, a portion of the length of film being formed as a roll and being disposed in the spool with the spool being formed so that the film can be payed out continuously either from the inside of the roll or the outside of the roll, optical means carried by the framework for viewing the portion of the film in the aperture, said framework being formed with an eyepiece which can be placed against the eye for viewing of the image provided by the optical means and means provided within the framework for receiving light exterior of the cartridge viewer and for directing light through the portion of the film in the aperture so that the portion of the film in the aperture is visible to the viewer through the optical means, said framework being in the form of a case having generally planar spaced parallel side walls and generally planar spaced parallel top and bottom walls, said crank means including a circular disc-like member recessed within one of said side walls so that its outer surface is generally flush with that of the side wall, said disc-like member being provided with a recess, a handle having spaced parallel planar sides, cooperative means carried by the handle and the disc-like drive member for connecting the handle to the drive member and permitting pivotal and rotational movement of the handle with respect to the drive member, said handle being movable to a position in said recess when it is not in use so that one of the spaced parallel planar sides of the handle is generally flush with the outer surface of the disc-like member.

* * * * *